C. W. G. KING.
METALLIC ROD PACKING.
APPLICATION FILED JUNE 2, 1914.
1,174,588.
Patented Mar. 7, 1916.
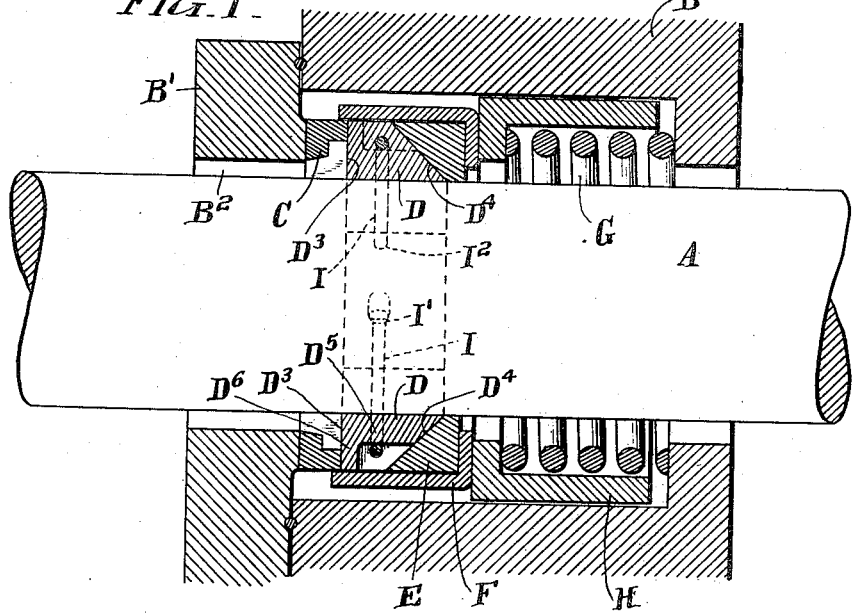
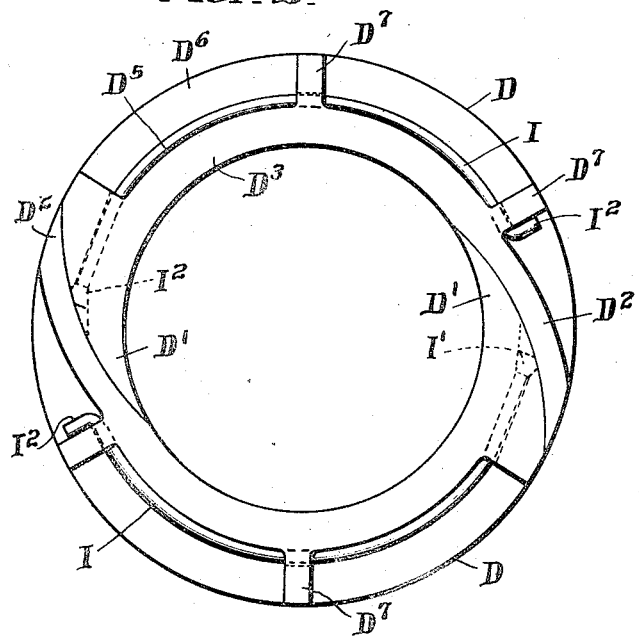
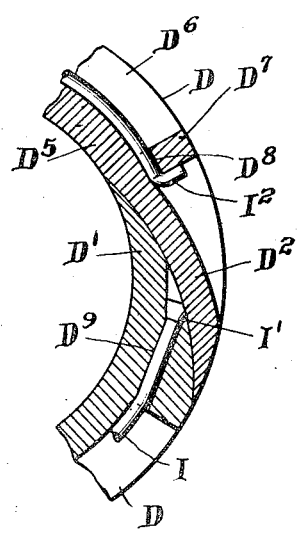
WITNESSES
INVENTOR
Charles W. G. King
BY
his ATTORNEY

UNITED STATES PATENT OFFICE.

CHARLES W. G. KING, OF PHILADELPHIA, PENNSYLVANIA, ASSIGNOR TO THE UNITED STATES METALLIC PACKING COMPANY, OF PHILADELPHIA, PENNSYLVANIA, A CORPORATION OF PENNSYLVANIA.

METALLIC ROD-PACKING.

1,174,588.  Specification of Letters Patent.  Patented Mar. 7, 1916.

Application filed June 2, 1914. Serial No. 842,364.

*To all whom it may concern:*

Be it known that I, CHARLES W. G. KING, a citizen of the United States of America, residing in the city and county of Philadelphia, in the State of Pennsylvania, have invented certain new and useful Improvements in Metallic Rod-Packings, of which the following is a true and exact description, reference being had to the accompanying drawings, which form a part thereof.

My present invention relates to metallic rod packings, and comprises an improvement in the shape or form of a metallic packing ring, devised with the object of reducing the weight of the ring without a corresponding reduction in the area of its packing or sealing surfaces, or an undue reduction in the strength of the ring; and also comprises novel provisions for preventing the separation of the sundered parts of a ring segment, in case the latter is fractured.

My improvements are especially advantageous for use where the rings are made out of a metal adapted to withstand relatively high temperatures, such as the rings for packing the piston rods of locomotives using superheated steam.

The various features of novelty characterizing my invention are pointed out with particularity in the claims annexed to and forming a part of this specification. For a better understanding of the invention, however, and of the advantages possessed by it, reference should be had to the accompanying drawings and descriptive matter, in which I have illustrated and described a preferred form in which my invention may be embodied.

Of the drawings: Figure 1 is a sectional elevation of a rod packing, the packing ring proper of which embodies my present invention; Fig. 2 is an end elevation of the packing ring; and Fig. 3 is a partial section of the packing ring, taken on the line 3—3 of Fig. 1.

In the packing construction somewhat conventionally illustrated in Fig. 1, B represents the hollow packing gland or body through which the rod A to be packed passes. The hollow gland B is closed at its outer end, except for an aperture $B^2$ loosely receiving the rod A, by a plate $B'$. A floating washer C surrounds the rod A, and has one end surface fitting snugly against the inner side of the plate $B'$. The packing ring proper, which is formed, as shown, of two similar interlocking segments D, D, has a radial end surface $D^3$, which bears against the inner end of the floating washer C. The opposite end surface $D^4$ of the packing ring is conical, and is engaged by a washer or follower E, having a conical surface fitting against the surface $D^4$ of the packing ring. The ring is surrounded by the annular retainer F, which comprises a body portion loosely surrounding the packing ring proper. A helical spring G, surrounding the rod A, acts against the inner end of the retainer F through the follower or washer H and the bottom wall of the chamber in the gland B.

In so far as described, the packing construction embodies nothing now novel with me. In particular, the packing ring segments D, D, are identical, in so far as their joint forming surfaces and their tapered overlapping end portions $D'$ and $D^2$ are concerned, with the packing ring disclosed in my prior Patent, No. 914,426, granted March 9, 1909. In such packing rings as have been heretofore constructed of the widely used type of packing ring disclosed by my said prior patent, each ring segment has been of uniform trapezoidal cross section from one tapered end portion to the other, the said uniform cross section being of the general shape of the section of the ring which appears above the rod A in Fig. 1.

With my improved ring, however, the cross section of the ring, generally speaking, is that shown below the rod A in Fig. 1, and the ring may be said to comprise an elongated cylindrical body portion $D^5$ bearing against the rod, and an out turned circumferentially extending flange portion $D^6$ at one end of said body portion $D^5$. The outer radial surface of the flange portion $D^6$ is the bearing surface $D^3$ engaging the inner end of the washer C. At intervals along the length of each segment, the latter is formed with axially extending ribs $D^7$, the outer edges of which are flush with the cylinder enveloping the flange portion $D^6$, while the end edges of the ribs, remote from the flange $D^6$, form extensions of the conical surface $D^4$ at the inner end of the ring body $D^5$. The cylindrical portion extends from the end of each segment including the end portion $D^2$ nearly or quite to the end portion $D'$, but the latter is not cut away and has the usual convex surface necessary to match the concave contacting surface of the mating end portion $D^2$.

With the construction described it will be seen that the joint forming, contact sealing, surfaces of the ring, which are those formed by the inner curved surface of the ring, the end surface $D^3$ and the contacting surfaces of the overlapping end portions $D'$ and $D^2$, may be of the desired area in a ring substantially lighter in weight than a ring uniform in cross section from one end to another, and having the same contact surface areas. I have found, moreover, that notwithstanding this cutting away, so to speak, of the ring, each ring segment may possess sufficient strength. This is especially true in the case of the packing rings formed of a material adapted to resist high temperatures, such as are required for packing the piston rods of locomotives using superheated steam. Rings for this purpose are made out of alloys, which, in general, possess more tensile strength, and are more costly, pound for pound, than the ordinary white metal packings heretofore generally employed. The relative high cost of the alloys used with superheated steam enhances the desirability of cutting away or reducing the weight of the packing rings, and the possibility of doing this is increased by the increased strength of these alloys.

A characteristic feature of the alloys used in forming packing rings to withstand the high temperatures of superheated steam, is the high temperature at which such an alloy must be poured in casting a ring therefrom. This temperature is frequently as high as the temperature at which cast iron is poured. Because of this high temperature, it is impossible to incorporate reinforcing or binding wires or grids in the ring segments, as set forth in my prior Patents, Nos. 1,017,674, granted Feb. 20, 1912, and 1,052,726, granted Feb. 11, 1913, respectively, for any metal out of which it is practically possible to form the wires or grids, would either have so low a melting point that it would melt out in the ring casting operation, or would be so hard that it would injure the rod, when the wearing of the ring brought it in contact therewith. At the same time it is highly desirable to provide means for tying the different portions of each segment together, so as to prevent the separation of the parts, in case the cast metal body of the ring breaks, as frequently occurs. Transverse fractures do not of themselves materially impair the efficiency of the ring as a packing device, so long as the parts are properly assembled in the packing. When it is necessary, as is the case from time to time, to take down the packing, it is a comparatively simple matter to properly reassemble the broken ring segments, if the latter are tied together, but if not tied together, the packing ring is usually scrapped, so that the value of the packing is materially enhanced by the use of suitable tying together means.

To provide my improved ring with a suitable binding or tying together means, I form holes $D^8$ in the ribs $D^7$ and a hole $D^9$ in the base of the end portion $D'$ of each segment. These holes are arranged in a circumferentially extending series, and receive a flexible wire I, of copper or soft brass. This wire is shown as headed or upset at $I'$ to prevent it from drawing through the hole $D^9$ which is counter sunk at its outer end. At its opposite end the wire is bent over at $I^2$ against the last rib $D^7$ penetrated by the wire. This last rib will ordinarily be the rib closest the segment end $D^2$. The binding wire I is easily applied. The holes $D^8$ and $D^9$ may be quickly formed in a drill press. Should the head $I'$ project above the convex surface of the segment end $D'$, when the binding wire is first inserted, this may be quickly and easily corrected by the use of a grinding wheel, which is usually required in practice to smooth the concave surface of the end $D'$.

The binding wire may be attached to the segment in any convenient way and at either two or more than two points. The specific construction shown is that which I believe to be the best construction.

The term "soft metal" as used in the specification and claims herein, is intended to apply to any metal which will flow under the conditions of use sufficiently to maintain a tight joint about the rod as the ring and rod wear.

While in accordance with the provisions of the statutes I have illustrated and described the best form of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

1. A soft metal packing ring formed of segments each comprising a body portion with an external circumferential flange portion at one edge thereof and having ribs on the outer surface of said body portion which extend transversely to and intersect said flange.

2. A soft metal packing ring formed of segments each comprising a body portion with an external circumferential flange portion at one edge thereof and having the outer corner at the opposite edge of said body portion beveled off, and having ribs on the outer surface of said body portion which extend transversely to and intersect said flange and have their ends remote from said flange beveled so that the beveled rib ends and the beveled off edge of the body portion of the ring contact with the same continuous surface of revolution.

3. A soft metal packing ring segment comprising a tapered end portion having a convex external surface intersecting the inner curved surface of the ring, a body portion of less radial depth than the base of said end portion extending from adjacent the base of the latter to the opposite end of the segment, and an external circumferential rib at one edge of said body portion.

4. A soft metal packing ring segment comprising a tapered end portion having a convex external surface intersecting the inner curved surface of the ring, a cylindrical body portion of less radial depth than the base of said end portion extending from adjacent the base of the latter to the opposite end of the segment, an external circumferential rib at one edge of said body portion, and other external ribs on said body portion which extend transversely to and intersect the first mentioned rib.

5. A soft metal packing ring segment comprising a cast metal body portion and a wrought metal binder extending around the outside of the segment and secured to it at two or more angularly displaced points.

6. A soft metal packing ring segment comprising a cast metal body portion formed with ribs on its outer surface and a wrought metal binder passing through said ribs and serving in case of a transverse fracture of said cast metal body portion to hold the sundered parts together.

7. A soft metal packing ring segment comprising a cast metal body portion formed with apertured ribs on its outer surface and a wire passing through the aperture in said ribs and having its ends shaped to prevent their passage through said apertures.

8. A soft cast metal packing ring segment comprising a tapered end portion having a convex external surface intersecting the inner curved surface of the ring and a cylindrical body portion of less radial depth than the base of said end portion extending from adjacent the base of the latter to the opposite end of the segment, an external circumferential rib at one edge of said body portion, and other ribs on said body portion which extend transversely to and intersect the first mentioned rib, said end portion being formed with a circumferentially extending aperture having one end enlarged and opening in said convex surface, and a circumferentially extending wire passing through said transversely extending ribs and through the aperture in said end portion and having a head received in the enlarged portion of said aperture and having its opposite end shaped to prevent it from being drawn through said apertures.

CHARLES W. G. KING.

Witnesses:
ARNOLD KATZ,
D. STEWART.